United States Patent
Leet et al.

(10) Patent No.: US 7,452,728 B2
(45) Date of Patent: Nov. 18, 2008

(54) METAL ION SEPARATION FROM AQUEOUS SOLUTIONS USING PHOTOSWITCHABLE IONOPHORES

(75) Inventors: Bob E. Leet, Scottsdale, AZ (US); Robert P. Meagley, Hillsboro, OR (US); Michael D. Goodner, Hillsboro, OR (US); Michael L. McSwiney, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 10/850,414

(22) Filed: May 20, 2004

(65) Prior Publication Data
US 2005/0258107 A1 Nov. 24, 2005

(51) Int. Cl.
*G01N 33/20* (2006.01)

(52) U.S. Cl. ............... 436/80; 422/68.1; 422/82.01; 436/73; 436/74; 436/79; 436/81; 436/82; 436/83; 436/84; 436/177

(58) Field of Classification Search ............. 436/73–84, 436/174, 177–178; 422/68.1, 82.01
See application file for complete search history.

(56) References Cited

OTHER PUBLICATIONS

Shinkai, S. et al, Chemistry Letters 1980, 283-286.*
Shiga, M. et al, Chemistry Letters 1980, 1021-1022.*
Shinkai, S. et al, Journal of the American Chemical Society 1981, 103, 111-115.*
Shinkai, S. et al, Chemistry Letters 1982, 499-500.*
Shinkai, S. et al, Bulletin of the Chemical Society of Japan 1984, 57, 2144-2149.*
Irie, M. et al, Journal of the American Chemical Society 1985, 107, 1024-1028.*
Shinkai, S. et al, Journal of Inclusion Phenomena 1984, 2, 111-118.*
Shinkai, S. et al, Bulletin of the Chemical Society of Japan 1985, 58, 1059-1060.*
Vogtle, F. et al, Angewandte Chemie International Edition in English 1993, 32, 1295-1297.*
Kimura, K. et al, Journal of the American Chemical Society 1997, 119, 2062-2063.*
Takeshita, M. et al, Tetrahedron Letters 1998, 39, 613-616.*
Sukwattanasinitt, M. et al, Tetrahedron Letters 2001, 42, 5291-5293.*
Xu, M. et al, Physical Chemistry Chemical Physics 2002, 4, 4030-4035.*
"Assisted Transfer of Heavy Metals Ions at Liquid/Liquid Interfaces : Elucidation of Transfer Mechanisms," Laure Tomaszewski, Graduate Thesis, 2000. (http://lepa.epfl.ch/ICP3-Theses/ICP3-Tomaszewski.html).
"Synthesis and Ionophoric Properties of Crown Ether Capped with a Convergent Hydroxamic Acid Function," Duck Hee Kim, Mi Yee Kim, Byung Ha Kang, and Suk-Kyu Chang, Department of Chemistry, Chung-Ang University, Seoul 156-756, Korea; Bull. Korean Chem. Soc., 2002, vol. 23, No. 1, p. 160.
"Dithienylcyclopentene Optical Switches: Towards Photoresponsive Supramolecular Materials," Linda Nienke Lucas, Thesis, Groningen : University Library Groningen, 2001, Chapter 2, "Photochromic Switches," pp. 21-45. (http://www.ub.rug.nl/eldoc/dis/science/l.n.lucas/c2.pdf).

(Continued)

*Primary Examiner*—Arlen Soderquist
(74) *Attorney, Agent, or Firm*—Blakely, Sokoloff, Taylor & Zafman LLP

(57) ABSTRACT

Methods and systems for the concentration and removal of metal ions from aqueous solutions are described, comprising treating the aqueous solutions with photoswitchable ionophores.

30 Claims, 7 Drawing Sheets

OTHER PUBLICATIONS

"What is a Crown Ether?," DuPont.com, Nov. 14, 2002. (http://www1.dupont.com/NASApp/dupontglobal/corp/index.jsp?page=/content/US/en_US/science/crownether.html).

"First principles studies of cis-trans photoisomerization dynamics and excited states in ethylene, stilbene, azobenzene and tatb," Jason Quenneville, Thesis, University of Illinois at Urbana-Champaign, 2003 (http://mtzweb.scs.uiuc.edu/resources/theses/quenneville/JQ_Thesis.htm) pp. 1-9.

"Treating wastes generated by copper electroplating tools," Bruce T. Maeda and Robert E. Woodworth, Microbar; and Ken Aitchison, Novellus Systems, Novellus Damascus—Technical Papers, 2000. (http://novellus.com/damascus/tec/tec_17.asp).

"Photoswitchable Azobis(benzo-15-crown-5) Ionophores as a Molecular Probe for Phase Boundary Potentials at Ion-Selective Poly(vinyl chloride) Liquid Membranes," Tohda, et al., Anal. Chem., 1997, 69, 3360-3369.

"Synthesis and Photoswitchable Complexation/Extraction Properties of Lipophilic Azobis(benzo-15-crown-5) Ionophores for Alkali Metal Cations," Odashima, et al., Heterocycles, vol. 47, No. 2, 1998.

"Liquid interfaces in Chemical, Biological, and Pharmaceutical Applications," Chapter 18: Liquid Membrane Ion-Selective Electrodes, Yoshio Umezawa, pp. 439-468, Published: Jan. 30, 2001, ISBN: 0-8247-0457-6.

"Characteristics of Lariat Crown Ether-Copper(II) Ion-Selective Electrodes," Chia-Ching Su, et al., Journal of the Chinese Chemical Society, 2001, 48, pp. 733-738.

"Emulsion-Liquid-Membrane Extraction of Copper Using a Hollow-Fiber Contactor," Shih-Yao B. Hu and John M. Wiencek, AIChE Journal, Mar. 1998, vol. 44, No. 3, pp. 570-581.

"Microemulsion Liquid Membranes II. Copper Ion Removal from Buffered and Unbuffered Aqueous Feed," Wiencek et al., Separation Science and Technology, 27(11), pp. 1407-1422, 1992.

"Polymer Data Handbook," James E. Mark, editor, Oxford University Press, 1999, pp. 857-858: "Poly(1,3-trimethyleneimine) dendrimers," by Tomalia, et al.

"A New Phase-Switch Method for Application in Organic Synthesis Programs Employing Immobilization through Metal-Chelated Tagging," Ley, et al., Angew. Chem. Int. Ed., 2001, 40, No. 6, pp. 1053-1055.

"Open-Face Macrobicycles as Tunable Binucleating Ligands. Design, Synthesis, and Dicopper (II) Complexes," Martin, et al., J. Am. Chem. Soc., 1982, 104, pp. 1434-1436.

"Potential photoresponse of membranes containing a lipophilic crowned spirobenzopyran," Kimura, et al., J. Chem. Soc., Perkins Trans., 2, 1999, pp. 2539-2544.

* cited by examiner

| 500 | Optionally, pre-treat effluent |

| 510 | Combine effluent with medium comprising photoswitchable ionophore and expose medium to ultraviolet light |

| 520 | Expose ionophore-copper complex to full spectrum light |

| 530 | Separate ionophore and copper by electrodeposition of copper cations or filtration of the ionophore |

Figure 5

METAL ION SEPARATION FROM AQUEOUS SOLUTIONS USING PHOTOSWITCHABLE IONOPHORES

FIELD OF THE INVENTION

Methods for the use of photoswitchable ionophores in the concentration and removal of metal ions from aqueous solutions are described.

BACKGROUND INFORMATION

The removal of metal ions from aqueous solutions is a process common to many manufacturing environments. For example, it may be desirable to remove metal ions from water supplies entering a manufacturing site if a manufacturing process is sensitive to those ions. Likewise, metal ions may be removed from effluent leaving the manufacturing site in order to recycle the metal or to mitigate the effect of the effluent on downstream treatment systems or the environment. In this case, the removal of metal ions may not need to eliminate all traces of them, but merely remove them to the degree that their remaining levels are below the regulatory limit.

A common system for removing metal ions from aqueous solutions involves the use of ion exchange resins, wherein the metal ion-containing aqueous solution is brought into contact with the ion exchange resin. As the name suggests, ion exchange resins work by exchanging one ion for another, causing metal ions to become bound to the ion exchange resin while releasing different ions.

For example, a typical ion exchange resin will exchange positively charged sodium ions (sodium cations) for other metal cations carried in the aqueous solution, resulting in the binding and removal of the metal cations but adding sodium ions to the aqueous solution. The ion exchange resin must be periodically regenerated to remove the accumulated metal cations or else its effectiveness will be diminished. It may be necessary to remove the resin from the system in order to regenerate it. Additionally, strong acids or other chemicals may be required to regenerate the resin, which may introduce new remediation challenges.

BRIEF DESCRIPTION OF THE DRAWINGS

Some embodiments of the present invention are illustrated, by way of example and not limitation, in the accompanying figures, in which like references indicate similar elements and in which:

FIG. 5 is a flow chart illustrating an embodiment of the present invention wherein an aqueous solution to be treated is exposed to a fixed medium comprising photoswitchable ionophore.

DETAILED DESCRIPTION

Figure 1:
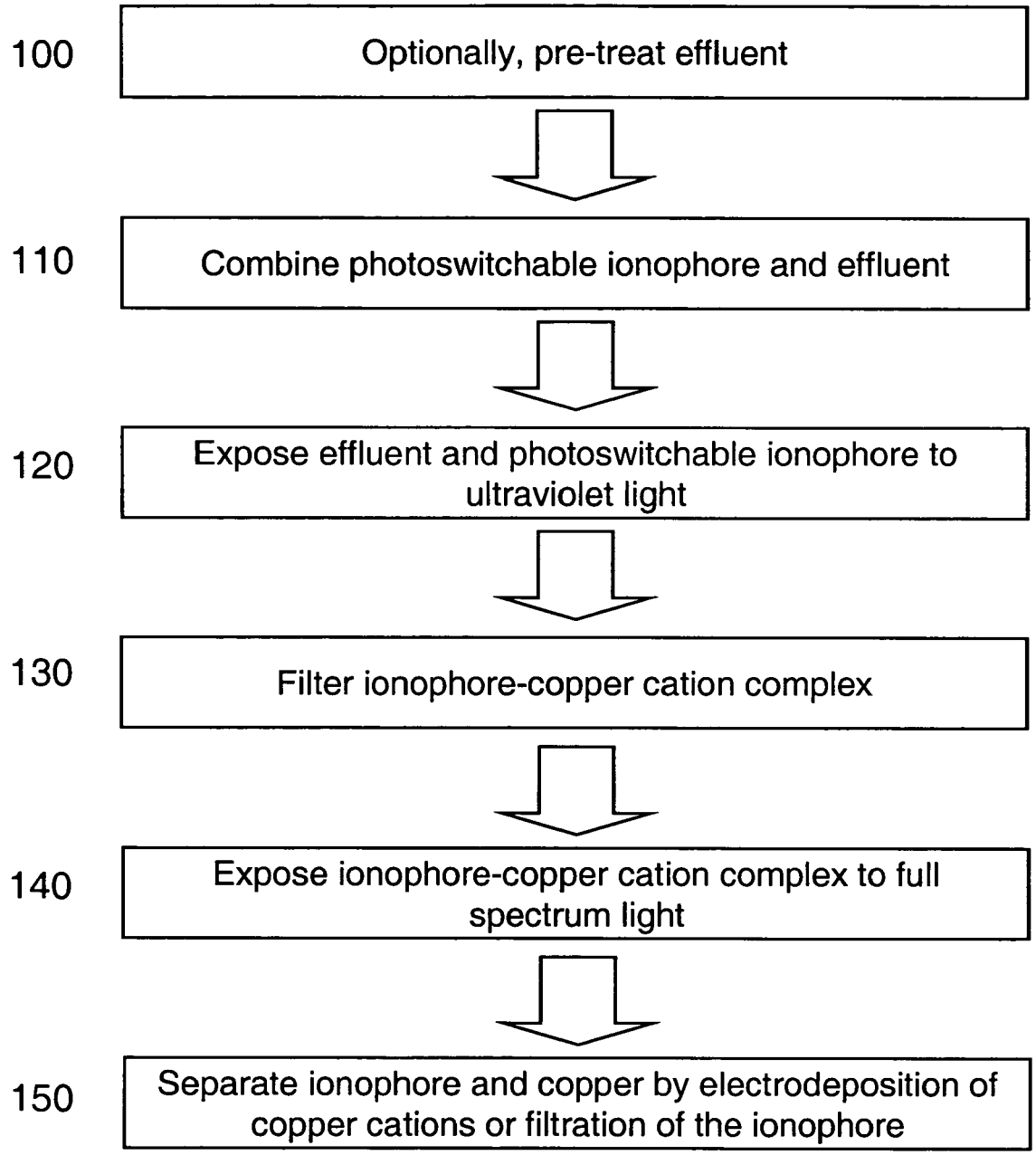
FIG. 1 is a flow chart illustrating an embodiment of the present invention wherein photoswitchable ionophore is added to an aqueous solution to be treated.

Methods for the concentration and removal of metal ions from aqueous solutions are described, comprising treating the aqueous solutions with photoswitchable ionophores.

Note that in this description references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

In the following description numerous specific details are set forth. However, it is understood that embodiments may be practiced without these specific details. It is also understood that the description of particular embodiments is not to be construed as limiting the disclosure to those embodiments. Well-known structures and techniques have not been shown in detail in order not to obscure the understanding of this description.

As used herein, the term "photoswitchable ionophore" generally refers to any agent that has an affinity for ions that can be reversibly changed through exposure to light, either of particular wavelengths or to full-spectrum light.

As used herein, the term "full-spectrum light" generally refers to light having one or more wavelengths outside the ultraviolet spectrum, though it may contain wavelengths within the ultraviolet spectrum as well. Some examples of full-spectrum light include sunlight (or solar light) and the light produced by incandescent, fluorescent, metal-vapor, or arc illumination sources.

Described herein are methods to concentrate and remove metal ions from aqueous solutions through the use of photoswitchable ionophores. Photoswitchable ionophores exhibit changeable affinities for metal ions, and those affinities are affected by exposure to light. Different wavelengths of light promote switching between cis and trans configurations. In the cis configuration, the ionophore has an elevated affinity for ions. In contrast, in the trans configuration the ionophore has a reduced affinity for ions. The formation of ionophore-ion complexes is reversible and the formation and/or dissociation of the complex can be prompted by exposing photoswitchable ionophore to light. By adding photoswitchable ionophore to an aqueous solution or by incorporating photoswitchable ionophore into membranes, resins, or other separation devices, it is possible to cause photoswitchable ionophore to form a complex with metal ions. Thus, the methods described herein can be used in systems for the removal of metal ions from aqueous solutions. The systems may be used for partial or essentially complete removal of metal ions.

For clarity, this description describes the use of azobis (benzene-15-crown-5) ionophores as photoswitchable ionophores. However, these embodiments are only illustrative and not restrictive. Other ionophores may be used without departing from the spirit of the disclosed embodiments and the scope of the appended claims. Some examples of other photoswitchable ionophores which may be employed include azobis(benzene-18-crown-6) ionophores and other azobis crown ethers, azobis lariat ethers, stilbene, and derivatives thereof.

An embodiment of the present invention uses photoswitchable ionophores known as azobis(benzo-15-crown-5) ionophores to reversibly form complexes with metal cations. Azobis(benzo-15-crown-5) ionophores are molecules which have a nitrogen-nitrogen double bond that can adopt cis and trans configurations. Switching between the cis and trans configurations is promoted by light, where ultraviolet light promotes formation of the cis configuration and full-spectrum light promotes formation of the trans configuration. Azobis(benzo-15-crown-5) ionophores have a greater affinity for some metal ions when in the cis configuration than they do when in the trans configuration. Thus, exposure of azobis (benzo-15-crown-5) ionophores to ultraviolet light can promote the formation of complexes with metal ions, while exposure to full-spectrum light can promote the dissociation of those complexes. After dissociation of the complexes, photoswitchable ionophore is preferably reused by again exposing it to ultraviolet light to promote the formation of new ionophore-ion complexes.

Some embodiments of the present invention provide for essentially continuous reuse of photoswitchable ionophore. After dissociation of metal-ionophore complexes, photoswitchable ionophore is left in the trans configuration. In this configuration, metal-ionophore complexes are not readily formed. Thus, the trans-configured photoswitchable ionophore can be reintroduced into a treatment system repeatedly and reused through photo-switching into the metal complexing cis configuration. In other embodiments, trans-configured ionophore may be stored for subsequent batch-wise reuse.

Optionally, photoswitchable ionophore may be chemically modified to have certain desirable properties. For example, it may be desirable to modify photoswitchable ionophore to increase its affinity for specific metal ions, to make it more selective, to increase or decrease its size, or to modulate its solubility in various phases. Techniques for chemically modifying photoswitchable ionophores are known in the art. For example, modifications for increasing specificity toward transition metal ions are described in *Heterocycles*, Volume 15, Number 2 (Umezawa, 1998).

Increased affinity and/or improved selectivity may be useful when trying to remove ions of a particular metal from solution. Modifications to the photoswitchable ionophore may be in the nature of, for example, alkyl, hydroxyl, ether or polymer substitutions to the 5 position of the aromatic ring of an azobis(benzo-15-crown-5) ionophore. Such modifications should be limited, however, to those which do not impede switching between the cis and trans configurations and the ability of the ionophore to reversibly bind to metal ions.

Some embodiments of the present invention incorporate electrodeposition with photoswitchable ionophores. As stated above, ionophore-metal complexes can be formed as a result of exposing photoswitchable ionophores to ultraviolet light, and subsequent exposure of these complexes to full-spectrum light promotes their dissociation and release of the metal ions. By further providing for electrodeposition of the metals ions, these embodiments facilitate the dissociation of the ionophore-metal complexes and removal of metal ions from solution. In an exemplary embodiment, metal cations which dissociate from the ionophore-metal complex are plated onto a cathode.

FIG. 1 is a flow chart outlining a method for concentration and separation of metal ions from an aqueous solution according to an embodiment, wherein a photoswitchable ionophore is added to the aqueous solution. The metal ions may be, for example, copper ions, and the aqueous solution may be, for example, effluent discharged from a semiconductor manufacturing facility. Photoswitchable ionophore is preferably reused in treatment of the effluent and may be reused in an essentially continuous process or in a batch-wise process.

In Block 100 of FIG. 1, the effluent may be pre-treated before photoswitchable ionophore is added. Preferably, pre-treatment includes filtration of particulates. The filtration preferably removes particulates which are of a size greater than or equal to the size of ionophore-copper complexes that will be formed in subsequent steps. This allows a subsequent filtration to remove ionophore-copper complexes without concurrent removal of the particulates.

Optionally, pre-treatment may also include pH adjustment. Any pretreatment employed should leave the effluent in a state which is conducive to removal of copper cations by photoswitchable ionophores. For example, the effluent pH should not be so acidic or basic that it interferes with the ability of the ionophore to reversibly bind the copper ions or chemically alters the ionophore.

In Block 110 of FIG. 1, photoswitchable ionophore is added to the effluent. The ionophore may be in any state including a solid, a suspension, or dissolved in a solution. Depending on the state of the ionophore, mixing, pH adjustment, temperature adjustment, etc. of the effluent-ionophore mixture may be necessary to promote binding of the ionophore to copper cations. The amount of ionophore added may depend on the nature of the effluent, the design of the effluent treatment system, and the requirements for the treated effluent. Thus, for example, it may be desirable to add more ionophore if the concentration of copper in the effluent is high, the treatment system has a short mixing stage, or the treated effluent must meet certain requirements for copper.

Preferably, the photoswitchable ionophore is of a type such that, after formation of the ionophore-copper complex, the complex has a size greater than the size of the particulates removed in Block 100. Using a photoswitchable ionophore of this type allows it to be removed from the system by filtration without also removing particulates. Optionally, photoswitchable ionophores may be chemically modified to increase the size of the ionophore-copper complex. Modifications to the photoswitchable ionophore may be in the nature of, for example, alkyl, hydroxyl, ether or polymer substitutions to the 5 position of the aromatic ring of an azobis(benzene-15-crown-5) ionophore. Such modifications must be limited, however, to those that do not impede switching between the cis and trans configurations and the ability of the ionophore to reversibly bind to metal ions.

Optionally, more than one type of photoswitchable ionophore may be added. For example, if the effluent comprises a variety of metal cations, or copper in various oxidation states, one may add other ionophores that have been chemically modified to have greater affinities for those species. Thus, multiple ionophores may be used concurrently to remove multiple species from the effluent. Preferably, multiple ionophore species would only be combined in systems in which each species does not hinder the metal ion complexing capability of the other species present in the system.

In Block 120 of FIG. 1, the effluent combined with photoswitchable ionophore is exposed to ultraviolet light. Ultraviolet light promotes switching between the trans and cis configurations of the ionophore and the binding of copper cations. In particular, ultraviolet light promotes the formation of the cis configuration, which has a higher affinity for copper than does the trans configuration. It is not necessary that all of the ionophore be in the cis configuration, although higher concentrations of the cis configuration are desirable because the cis-configured ionophore exhibits a significantly greater affinity for copper cations.

As will be apparent to those skilled in the art, the use of ultraviolet light to promote switching is dependent on the nature of the photoswitchable ionophore employed. Other photoswitchable ionophores may be employed which are promoted to switch through exposure to other light sources. For example, embodiments employing stilbene derivatives as photoswitchable ionophores may utilize full-spectrum light to promote switching and promote the reverse transformation by isolating the stilbene derivative from light (that is, putting the stilbene derivative-ion complexes in the dark).

The exposure to ultraviolet light may be, for example, continuous or in the form of a pulse or repeated pulses. The intensity, duration, proximity and relative location of the exposure and the frequency of the pulses, if any, will depend on the nature of the effluent, the design of the effluent treatment system, and the requirements for the treated effluent.

In Block 130 of FIG. 1, ionophore-copper complex is concentrated. Ionophore-copper complex forms as a result of the photoswitching of the ionophore promoted by the exposure to ultraviolet light in Block 120. Concentration of the complex may be achieved in a number of ways depending on the design of the effluent treatment system, the nature of the effluent, and the nature of the ionophore-copper complex. For example, the ionophore-copper complex may be filtered out of the effluent or otherwise caused to precipitate. The effluent may be passed through a filter that is impermeable to the ionophore-copper complex. Preferably, the filter removes the ionophore-copper complex without also removing particulates. After concentration and removal of the ionophore-copper complex, the effluent will have a lower concentration of copper than the initial effluent stream, thus achieving partial or complete remediation of the effluent.

In Block 140 of FIG. 1, the concentrated ionophore-copper complex is exposed to full-spectrum light. Full-spectrum light promotes switching between the cis and trans configurations of the ionophore and the release of copper cations. In particular, exposure to full-spectrum light promotes the formation of the trans-configured ionophore, which exhibits a lower affinity for copper cations than the cis configuration. Thus, exposure to full-spectrum light promotes the release of copper cations.

As will be apparent to those skilled in the art and note above the use of full-spectrum light to promote the release of ions from the photoswitchable ionophore-ion complexes is dependent on the nature of the photoswitchable ionophore employed. Other photoswitchable ionophores may be employed which are promoted to switch through exposure to other light sources or removal of light entirely. For example, embodiments employing stilbene derivatives as photoswitchable ionophores may promote the release of ions by isolating the stilbene derivative complexes from light (that is, putting the stilbene derivative-ion complexes in the dark).

The exposure to full-spectrum light may be continuous or in the form of a pulse or repeated pulses. The intensity, duration, proximity and relative location of the exposure and the frequency of the pulses, if any, may depend on the nature of the ionophore-copper complex, the design of the effluent treatment system, and the requirements for the treated effluent.

In Block 150 of FIG. 1, copper metal may be caused to electrodeposit. Preferably, copper cations released from the ionophore-copper complex are reduced to copper metal through cathodic reduction. Removal of copper cations by cathodic reduction allows copper to be recovered in a solid phase that eases handling. Furthermore, removal of copper cations by cathodic reduction will help drive the dissociation of the ionophore-copper complex. Electrodeposition of copper metal may be combined with the exposure of the ionophore-metal complex to full-spectrum light, or may be conducted in a separate step. Since copper cations released from the ionophore complex will be in a reactive state, optionally, it may be desired to positively bias the walls of the copper recovery vessel to prevent undesired copper deposition or etching of the walls by the active copper cations.

Alternatively, the copper may be separated from the ionophore by filtering the ionophore-copper solution after the ionophore has been illuminated to switch to the trans configuration. The ionophore, having a much larger size than the copper cations, can be filtered out and reused, while the copper solution has been greatly concentrated compared to the incoming effluent stream.

After dissociation of the ionophore-copper complex, the photoswitchable ionophore is preferably reused in the effluent treatment process. Exposure to full-spectrum light and electrodeposition of copper leaves the photoswitchable ionophore in the trans configuration and ready to be returned to the treatment process for reuse. Reuse may be essentially continuous or may be batch-wise. In an embodiment of the present invention, photoswitchable ionophore is reused by reintroduction at Block 110 of FIG. 1. Optionally, photoswitchable ionophore may be pretreated before reuse, for example by filtration, rinsing and/or pH adjustment.

Figure 2:
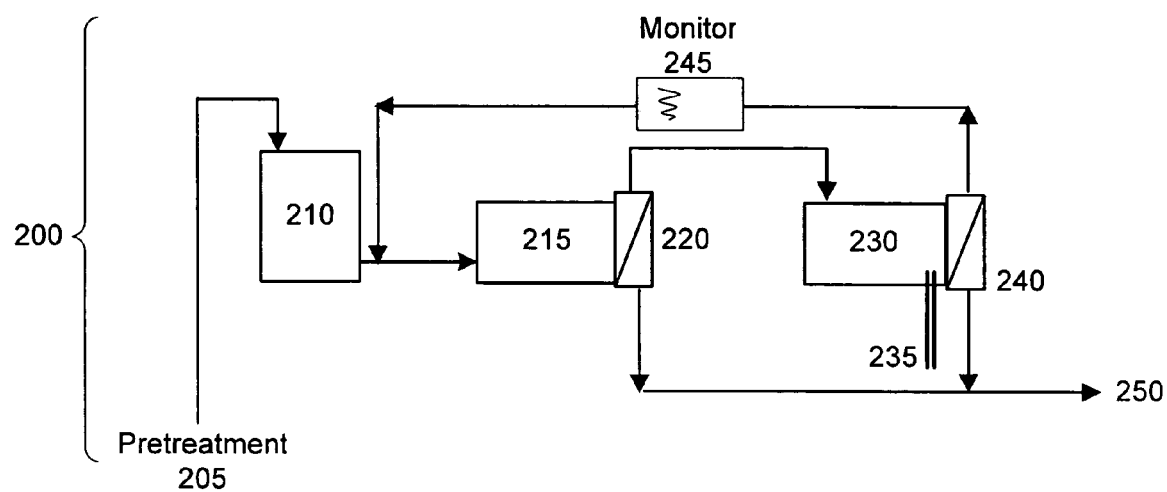
FIG. 2 illustrates a diagram of a treatment system according to an embodiment of the present invention, wherein photoswitchable ionophore is added to an aqueous solution to be treated.

FIG. 2 illustrates a diagram of a treatment system 200 according to an embodiment of the present invention, wherein photoswitchable ionophore is added to an aqueous solution to be treated. Treatment system 200 may be, for example, a metal recovery system for recovery of copper from effluent. Photoswitchable ionophore is preferably reused, and thus photoswitchable ionophore added to the effluent may originate at a later stage of metal recovery system 200.

In system 200, effluent that contains copper enters feed tank 210 from pretreatment system 205. Pretreatment system 205 may include provisions for pH adjustment, precipitation, flocculation, filtration or other pretreatment processes. Preferably, pretreatment system 205 filters out particulates that are of a size greater than or equal to the size of ionophore-copper complexes formed in subsequent stages of the metal recovery system.

Effluent moves from feed tank 210 to complex formation tank 215. Preferably, photoswitchable ionophore is added to the effluent between feed tank 210 and complex formation tank 215. However, it may be added before or after this point. In complex formation tank 215 the mixture of effluent and photoswitchable ionophore is exposed to ultraviolet light, which promotes switching between the trans and cis configurations of the ionophore and the binding of copper cations.

Filter element 220 concentrates ionophore-copper complex. Concentrated ionophore-copper complex is passed to recovery subsystem 230 while effluent, now depleted of ionophore-copper complex, is passed out of metal recovery system 200 via discharge point 250. System 200 optionally includes provisions for recycling the effluent exiting complex formation subsystem 215 through subsystem 215 one or more times, thus reducing the concentration of copper in the effluent even further before discharging the effluent at discharge point 250.

Concentrated ionophore-copper complex accumulates in recovery subsystem 230. Recovery subsystem 230 includes devices for provision of full-spectrum light in order to promote the switching between the cis and trans configurations of photoswitchable ionophore and the release of copper cations. Optionally, recovery subsystem 230 also includes electrodes 235 for cathodic reduction of copper metal.

Material exiting recovery subsystem 230 encounters filter 240. Preferably, filter 240 traps dissociated ionophores and ionophore complexes, and allows other aqueous medium such as water, acids, bases, buffers, degraded photoswitchable ionophores breakdown products, and any other miscellaneous effluent to discharge to point 250. Thus, filter 240 contains dissociated ionophores and ionophore-copper complexes in recovery subsystem 230 and enables reuse or recycle of the ionophore species. Reuse or recycle may be essentially continuous or may be batch-wise.

After passing through filter 240, material containing dissociated ionophores is preferably monitored by ionophore condition monitoring system 245. Ionophore condition monitoring system 245 provides information on the condition of the photoswitchable ionophore. For example, ionophore condition monitoring system 245 may include provisions for chromatographic analysis to determine the concentration of photoswitchable ionophore and/or detect breakdown products indicative of degradation of photoswitchable ionophore.

Dissociated ionophore is preferably reintroduced into effluent system 200 for reuse. Reuse may be essentially continuous or may be batch-wise. For example, dissociated ionophore may be reintroduced between feed tank 210 and complex formation tank 215, although the reintroduction may occur before or after this point.

Figure 3:
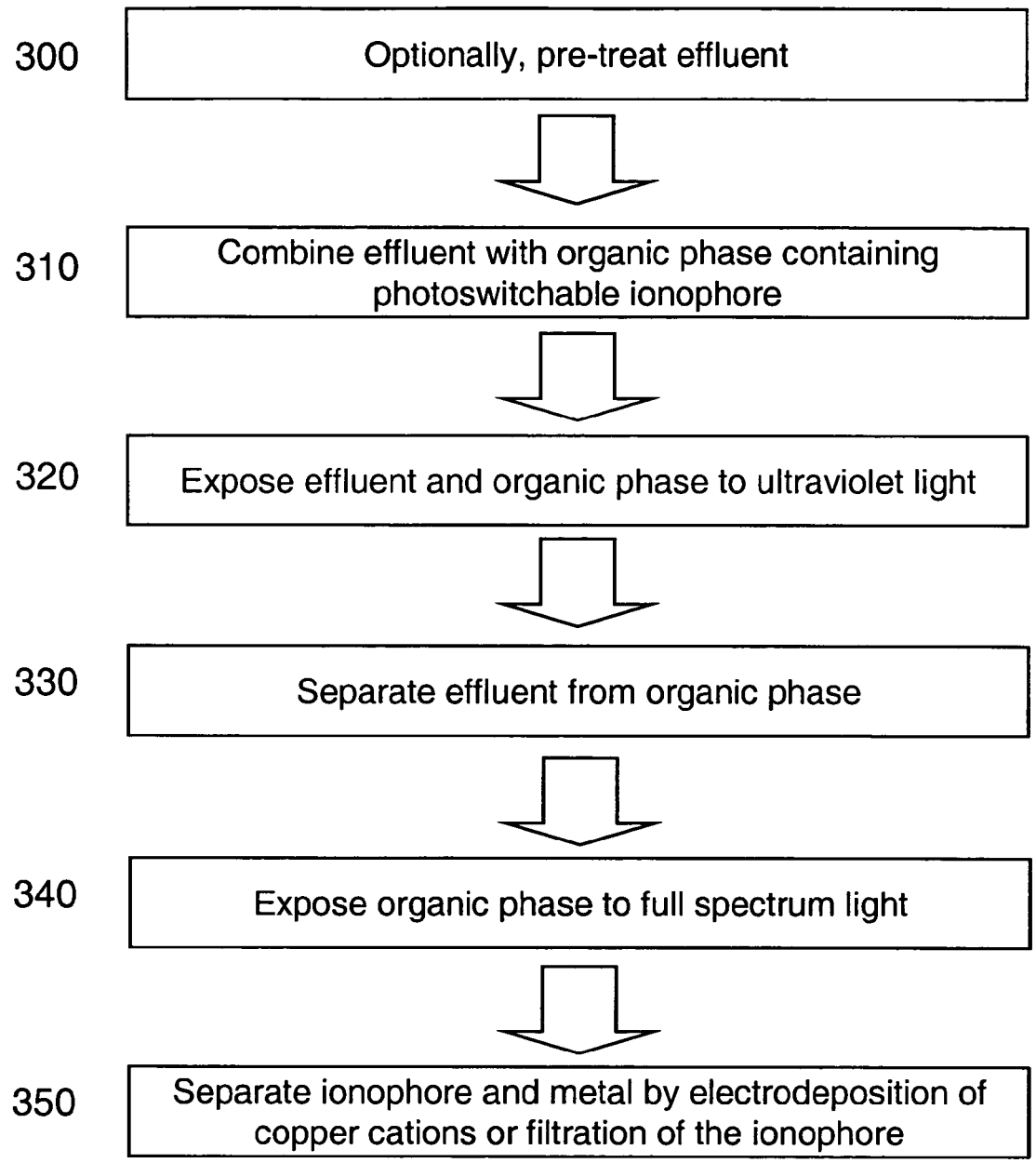
FIG. 3 is a flow chart illustrating an embodiment of the present invention wherein an organic phase containing photoswitchable ionophore is added to an aqueous solution to be treated.

FIG. 3 is a flow chart illustrating an embodiment of the present invention wherein an organic phase containing photoswitchable ionophore is added to an aqueous solution to be treated. The method may be used, for example, for the concentration and recovery of copper from effluent, wherein an organic phase containing photoswitchable ionophore is added to the effluent and copper-ionophore complexes are formed through liquid-liquid extraction. Photoswitchable ionophore is preferably reused in treatment of the effluent and may be reused in an essentially continuous process or in a batch-wise process.

In Block 300 of FIG. 3, effluent is optionally pre-treated. Optional pre-treatment may include, for example, filtration of particulates and/or pH adjustment. Any pretreatment employed should leave the effluent in a state that is conducive to removal of copper cations by photoswitchable ionophores. For example, the effluent pH should not be so acidic or basic that it interferes with the ability of the ionophore to reversibly bind the copper ions or chemically alters the ionophore. Optional pre-treatment may also include treating the effluent to encourage the separation of aqueous and organic phases during subsequent steps of the liquid-liquid extraction.

In Block 310 of FIG. 3, photoswitchable ionophore in an organic phase is added to the effluent. Photoswitchable ionophore added in Block 310 is preferably reused, and may originate from a subsequent step such as one described in Block 350. Mixing of the organic phase with the effluent may be desirable to promote binding of photoswitchable ionophore in the organic phase to copper cations in the effluent during subsequent exposure to ultraviolet light. It may be necessary or desirable to chemically modify the photoswitchable ionophore to increase its solubility in the organic phase and/or decrease its solubility in the effluent phase. Modifications to the photoswitchable ionophore may be in the nature of, for example, long chain alkyl substitutions to the 5 position of the aromatic ring of an azobis(benzene-15-crown-5) ionophore. Modifications must be limited, however, to those that do not impede switching between the cis and trans configurations and the ability of the ionophore to reversibly bind to metal ions.

Optionally, more than one type of photoswitchable ionophore may be dissolved in the organic phase. For example, if the effluent comprises a variety of metal cations, or copper in various oxidation states, it may be desirable to dissolve other ionophores that have been chemically modified to have greater affinities for those species. Thus, multiple ionophores may be used concurrently in a single organic phase to remove multiple species from the effluent. Preferably, multiple ionophore species would only be combined in systems in which each species does not hinder the metal ion complexing capability of the other species present in the system.

In Block 320 of FIG. 3, the mixture of effluent and organic phase is exposed to ultraviolet light. Ultraviolet light promotes switching between the trans and cis configurations of the ionophore and the binding of copper cations. Once bound, copper cations will be removed from the effluent and carried in the organic phase by the photoswitchable ionophore. The exposure to ultraviolet light may be, for example, continuous or in the form of a pulse or repeated pulses. The intensity, duration, proximity and relative location of the exposure and the frequency of the pulses, if any, will depend on the nature of the effluent, the design of the effluent treatment system, and the requirements for the treated effluent. Preferably, mixing of the phases is maintained during exposure to ultraviolet light.

In Block 330 of FIG. 3, the effluent is separated from the organic phase. Since the ionophore-copper complex is carried in the organic phase, this separation results in at least partial removal of copper from the effluent. Preferably, the concentration of photoswitchable ionophore dissolved in the organic phase, and the volume of organic phase used, is such that the resulting concentration of copper in the organic phase is higher than the concentration in the untreated effluent.

In Block 340 of FIG. 3, organic phase containing ionophore-copper complex is exposed to full-spectrum light. Full-spectrum light promotes switching between the cis and trans configurations of the ionophore and the release of copper cations. Exposure to full-spectrum light promotes the formation of the trans-configured ionophore, which exhibits a lower affinity for copper cations than the cis configuration. Thus, exposure to full-spectrum light promotes the release of copper cations.

The exposure to full-spectrum light may be continuous or in the form of a pulse or repeated pulses. The intensity, duration, proximity and relative location of the exposure and the frequency of the pulses, if any, may depend on the nature of the ionophore-copper complex, the design of the effluent treatment system, and the requirements for the treated effluent.

In Block 350 of FIG. 3, copper metal may be caused to electrodeposit. Preferably, copper cations released from the ionophore-copper complex are reduced to copper metal through cathodic reduction. Electrodeposition of copper metal may be combined with the exposure of the ionophore-metal complex to full-spectrum light, or may be conducted in a separate step. Since copper cations released from the ionophore complex will be in a reactive state, it may be desirable to positively bias the walls of the copper recovery vessel to prevent undesired copper deposition or etching of the walls by the active copper cations.

Alternatively, the copper may be separated from the ionophore by filtering the ionophore-copper solution after the ionophore has been illuminated to switch to the trans configuration. The ionophore, having a much larger size than the copper cations, can be successfully filtered out and reused, while the copper solution has been greatly concentrated compared to the incoming effluent stream.

After dissociation of the ionophore-copper complex, the organic phase containing photoswitchable ionophore is preferably reused in the effluent treatment process. Exposure to full-spectrum light and electrodeposition of copper leaves the photoswitchable ionophore in the organic phase ready to be returned to the treatment process for reuse. Reuse may be, for example, by way of combination with effluent in Block 310 of FIG. 3. Optionally, photoswitchable ionophore may be pretreated before reuse, for example by filtration, rinsing and/or pH adjustment.

Figure 4:
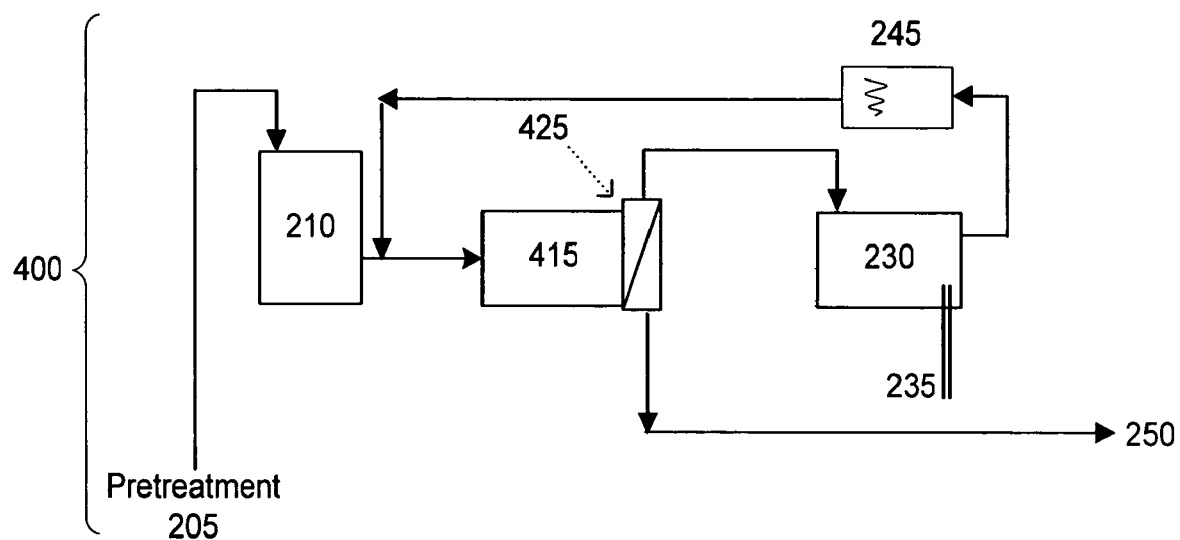
FIG. 4 illustrates a diagram of a treatment system according to an embodiment of the present invention, wherein an organic phase containing photoswitchable ionophore is added to an aqueous solution to be treated.

FIG. 4 illustrates a diagram of a treatment system 400 according to an embodiment of the present invention, wherein an organic phase containing photoswitchable ionophore is added to an aqueous solution to be treated. treatment system 400 may be, for example, an effluent treatment system wherein an organic phase containing photoswitchable ionophore is added to effluent and copper-ionophore complexes are formed through liquid-liquid extraction.

In system 400, effluent that contains copper enters feed tank 210 from optional pretreatment system 205. Pretreatment system 205 may include provisions for pH adjustment, precipitation, flocculation, filtration or other pretreatment processes. Optional pre-treatment may also include treating the effluent to encourage the separation of aqueous and organic phases during subsequent stages of the liquid-liquid extraction.

Effluent moves from feed tank 210 to complex formation subsystem 415. In complex formation subsystem 415, effluent is combined with organic phase containing photoswitchable ionophore. Photoswitchable ionophore is preferably reused, and thus photoswitchable ionophore added to the effluent may originate at a later stage of system 400. Complex formation subsystem 415 may include provision for mixing the effluent with the organic phase. Complex formation subsystem 415 also includes provisions for exposing the mixture to ultraviolet light, which promotes switching between the trans and cis configurations of the ionophore and the binding of copper cations. Once bound, copper cations are carried by the photoswitchable ionophore in the organic phase.

Complex formation subsystem 415 includes separation subsystem 425. In separation subsystem 425, the effluent and organic phases are allowed to separate and the organic phase is diverted to recovery subsystem 230.

Effluent exiting complex formation subsystem 415, now with reduced copper concentration, may be directed to discharge point 250. System 400 optionally includes provisions for recycling the effluent exiting complex formation subsystem 415 through subsystem 415 one or more times, thus reducing the concentration of copper in the effluent even further before discharging the effluent at discharge point 250.

Organic phase containing ionophore-copper complexes accumulates in recovery subsystem 230. Recovery subsystem 230 includes provisions for exposing the organic phase to full-spectrum light, which promotes switching of photoswitchable ionophore between the cis and trans configurations and release of copper cations. Preferably, recovery subsystem 230 may include electrodes 235 for cathodic reduction of copper metal.

After passing through recovery subsystem 230, organic phase containing dissociated ionophores is preferably monitored by ionophore condition monitoring system 245. Ionophore condition monitoring system 245 provides information on the condition of the photoswitchable ionophore. For example, ionophore condition monitoring system 245 may include provisions for chromatographic analysis to determine the concentration of photoswitchable ionophore and/or detect breakdown products indicative of degradation of photoswitchable ionophore.

Dissociated ionophores are preferably reintroduced into system 400 for reuse. Dissociated ionophores may be reintroduced between feed tank 210 and complex formation tank 415, although the reintroduction may occur before or after this point. Reuse may be essentially continuous or may be batch-wise.

FIG. 5 is a flow chart illustrating an embodiment of the present invention wherein an aqueous solution to be treated is exposed to a fixed medium comprising photoswitchable ionophore. The method may be used, for example, for the recovery of copper from effluent wherein the effluent is exposed to a fixed medium comprising a photoswitchable ionophore. Photoswitchable ionophore is preferably reused in treatment of the effluent.

In Block 500 of FIG. 5, effluent is optionally pre-treated. Optional pre-treatment may include, for example, filtration of particulates and/or pH adjustment. Any pretreatment employed should leave the effluent in a state that is conducive to removal of copper cations by photoswitchable ionophores. For example, the effluent pH should not be so acidic or basic that it interferes with the ability of the ionophore to reversibly bind the copper ions or chemically alters the ionophore.

In Block 510 of FIG. 5, effluent is brought into contact with a fixed medium comprising photoswitchable ionophore and exposed to ultraviolet light. The medium may be implemented using a variety of approaches so long as the medium exposes photoswitchable ionophore to copper species in the effluent. Preferably, the medium does not allow photoswitchable ionophore to escape into the effluent stream. For example, the medium may be a porous, high surface area resin (similar to ion exchange resins) to which photoswitchable ionophore is bound.

As effluent comes into contact with the medium, copper species pass through the medium and come into contact with photoswitchable ionophore. The medium comprising photoswitchable ionophore is exposed to ultraviolet light to promote switching between the trans and cis configurations and the formation of ionophore-copper complexes. Copper becomes bound to the fixed medium as ionophore-copper complexes form.

In Block 520 of FIG. 5, the medium with copper bound to photoswitchable ionophore is exposed to full-spectrum light to promote switching between the cis and trans configurations and the dissociation of ionophore-copper complexes. Since copper is released during exposure to full-spectrum light, any flow through the medium should be diverted to a recovery subsystem. The recovery subsystem preferably reduces copper through cathodic reduction.

Depending on the design of the effluent treatment system it may be desirable to reverse flow or back-flush the medium during exposure to full-spectrum light. It may also be desirable to remove the medium to another location before exposure to full-spectrum light, if the effluent treatment system is not designed for diverting flow to a recovery subsystem. After dissociation of ionophore-copper complexes, the medium is preferably reused for further effluent treatment.

In Block 530 of FIG. 5, copper diverted to the recovery system may be reduced by cathodic reduction. Electrodes for reduction can be implemented directly in the capture subsystem, but may be also or alternatively be implemented in a separate subsystem. Since copper cations released from the ionophore complex will be in a reactive state, it may be desired to positively bias the walls of the copper recovery vessel to prevent undesired copper deposition or etching of the walls by the active copper cations.

Figure 6:
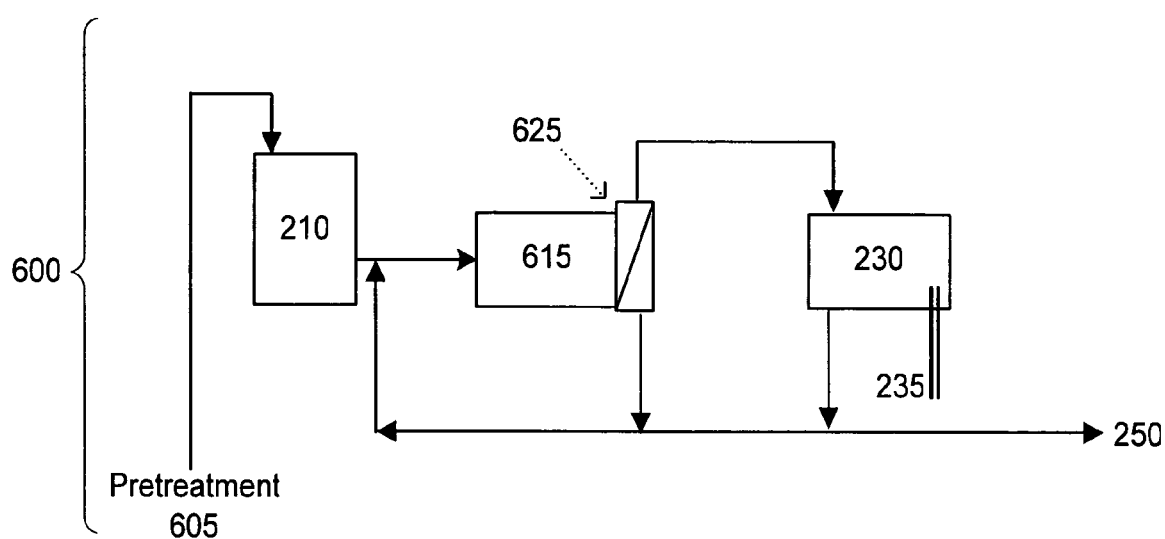
FIG. 6 illustrates a diagram of a treatment system according to an embodiment of the present invention, wherein an aqueous solution to be treated is exposed to a fixed medium comprising photoswitchable ionophore.

FIG. 6 illustrates a diagram of a treatment system 600 according to an embodiment of the present invention, wherein an aqueous solution to be treated is exposed to a fixed medium comprising photoswitchable ionophore. Treatment system 600 may be, for example, an effluent treatment system wherein the effluent is exposed to a fixed medium comprising photoswitchable ionophore.

In system 600, effluent that contains copper enters feed tank 210 from optional pretreatment system 205. Pretreatment system 205 may include provisions for pH adjustment, precipitation, flocculation, filtration or other pretreatment processes.

Effluent moves from feed tank 210 to complex formation subsystem 615. Complex formation subsystem 615 includes a fixed medium 625 comprising photoswitchable ionophore. Medium 625 may be, for example, a resin to which photoswitchable ionophore is bound or a membrane incorporating the ionophore. Preferably, medium 625 is reused from earlier effluent treatments. Complex formation subsystem 615 includes provisions for exposing medium 625 to ultraviolet light, which promotes switching between the trans and cis configurations of the ionophore and the binding of copper cations.

Effluent exiting complex formation subsystem 615 may be directed to discharge point 250. System 600 optionally includes provisions for reintroducing effluent exiting complex formation subsystem 615 into system 600 ahead of complex formation subsystem 615. This allows retreatment of the effluent at fixed medium 625.

Complex formation subsystem 615 also includes provisions for exposing medium 625 to full-spectrum light, which promotes switching between the cis and trans configurations of the ionophore and the release of copper cations. Exposure to full-spectrum light is preferably coordinated with flushing medium 625 to recovery subsystem 230. For example, exposure to full-spectrum light may take place while valves divert flow from complex formation subsystem 615 through medium 625 to recovery subsystem 230. After exposure to full-spectrum light and flushing, medium 625 is preferably reused to treat more effluent.

Concentrated copper cations accumulate in recovery subsystem 230. Preferably, recovery subsystem 230 includes electrodes 235 for cathodic reduction of copper metal. Effluent exiting recovery subsystem 230 is directed to discharge point 250.

Figure 7:
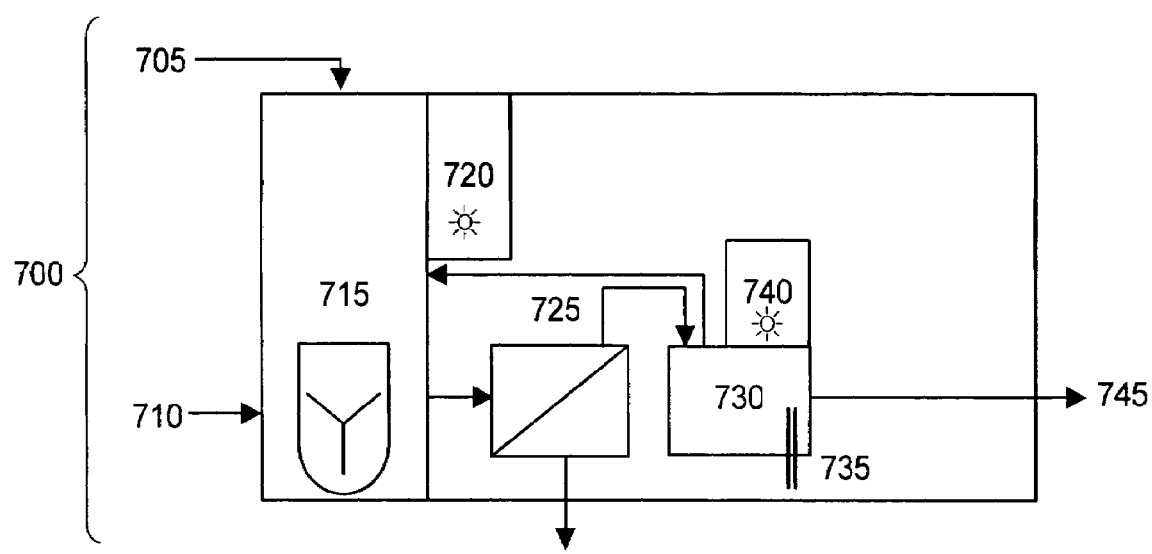
FIG. 7 illustrates a diagram of a device according to an embodiment of the present invention.

FIG. 7 illustrates a diagram of a device 700 according to an embodiment of the present invention.

Device 700 includes a source 705 of a solution containing metal ions and a source 710 of a photoswitchable ionophore. Preferably, device 700 includes provisions to mix the solution with the photoswitchable ionophore. Such provisions may be, for example, a mixing chamber 715.

Device 700 also includes a light source 720 to promote switching of the photoswitchable ionophore and the formation of ionophore-ion complexes. Light source 720 may be, for example, a source to emit primarily ultraviolet light to promote the switching of a photoswitchable ionophore such as azobis(benzene-15-crown-5) ionophore or other azobis crown or lariat ether. For embodiments employing stilbene derivatives as photoswitchable ionophores, light source 720 may utilize full-spectrum light.

Device 700 also includes a separator 725 to separate complexes from the solution. Mixing chamber 715 communicates with separator 725 with, for example, a tubing section, to pass complexes from the mixing chamber to the separator. Separator 725 may be, for example, a filter.

Complexes separated in separator 725 pass to dissociator 730. Dissociator 730 includes a light source 740 to promote the dissociation of complexes and the release of metal ions from the photoswitchable ionophore. Light source 740 may be, for example, a source of full-spectrum light to promote the dissociation of complexes formed from a photoswitchable ionophore such as azobis(benzene-15-crown-5) ionophore.

Device 700 preferably also includes provisions for electrodeposition of metal ions released from complexes in dissociator 730. Such provisions may be, for example, electrodes 735 for cathodic reduction of copper metal. Dissociator 730 may communicate with mixing chamber 715 to pass recovered photoswitchable ionophore from the dissociator to the mixing chamber. Thus, the photoswitchable ionophore may be reused repetitively to treat the ion-containing solution.

While some embodiments described above specifically relate to the removal of copper from effluent, these embodiments are only illustrative and not restrictive. They have been provided primarily for a clear and comprehensive understanding, and no unnecessary limitations are to be understood therefrom. Other metals may be removed with the described ionophores, or with photoswitchable ionophores selected for a high affinity for the metal that is desired to be removed. Likewise, aqueous solutions other than effluent may be treated, and systems may be implemented on many scales, including large treatment plants and small benchtop units. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
   providing a solution containing metal ions;
   providing a photoswitchable ionophore;
   exposing the solution to the photoswitchable ionophore;
      promoting the formation of complexes by exposing the photoswitchable ionophore to a first light source, wherein the first light source is primarily ultraviolet light;
   separating at least some complexes from the solutions;
   promoting the dissociation of separated complexes by exposing the complexes to full-spectrum light; and
   isolating metal from dissociated complexes using electrodeposition.

2. The method of claim 1, wherein the photoswitchable ionophore is an azo bis ether ionophore.

3. The method of claim 2, wherein the photoswitchable ionophore is an azobis(benzo-15-crown-5) ionophore.

4. The method of claim 2, wherein the photoswitchable ionophore is an azobis(benzo-18-crown-6) ionophore.

5. The method of claim 2, wherein the photoswitchable ionophore is an azo bis lariat ether.

6. The method of claim 2, wherein the photoswitchable ionophore is functionalized to increase specificity toward transition metal ions.

7. The method of claim 1, wherein the photoswitchable ionophore is a stilbene derivative.

8. The method of claim 7, further comprising:
   promoting the dissociation of separated complexes by shielding them from light.

9. The method of claim 1, wherein separating at least some complexes from the solution comprises filtering complexes from the solution based on a size of the complexes.

10. The method of claim 1, wherein the solution is an aqueous phase; wherein providing a photoswitchable ionophore comprises providing an organic phase containing the photoswitchable ionophore; and
wherein separating at least some complexes from the solution comprises separating the organic phase from the aqueous phase.

11. The method of claim 1, wherein providing a photoswitchable ionophore comprises providing a medium to which the photoswitchable ionophore is bound; and
wherein separating at least some complexes from the solution comprises separating the solution from the medium.

12. The method of claim 1, wherein at least some of the metal ions are copper ions.

13. The method of claim 1, further comprising:
providing a second photoswitchable ionophore;
exposing the solution to the second photoswitchable ionophore; and
promoting the formation of other complexes by exposing the second photoswitchable ionophore to the first light source or a different type of light source.

14. A system comprising:
a source of a solution containing metal ions; a
source of photoswitchable ionophore;
a light source to promote the formation of complexes;
a mixer; and
a separator to separate complexes from the solution;
wherein the source of photoswitchable ionophore is to provide a medium to which the photoswitchable ionophore is bound; and
wherein the separator is to separate the solution from the medium.

15. The system of claim 14, wherein the light source is to provide primarily ultraviolet light.

16. The system of claim 15, wherein the source of photoswitchable ionophore is to provide an azo bis ether ionophore.

17. The system of claim 16, wherein the source of photoswitchable ionophore is to provide an azobis(benzo-15-crown-5) ionophore.

18. The system of claim 16, wherein the source of photoswitchable ionophore is to provide an azobis(benzo-18-crown-6) ionophore.

19. The system of claim 16, wherein the source of photoswitchable ionophore is to provide an azo bis lariat ether.

20. The system of claim 16, wherein the source of photoswitchable ionophore is to provide a photoswitchable ionophore that is functionalized to increase specificity toward transition metal ions.

21. The system of claim 15, further comprising a dissociator to provide full-spectrum light.

22. The system of claim 21, further comprising a cathode.

23. The system of claim 14, wherein the source of photoswitchable ionophore is to provide a stilbene derivative.

24. The system of claim 23, further comprising a dissociator to shield the complexes from light.

25. The system of claim 14, wherein the separator comprises a filter to separate complexes from the solution based on a size of the complexes.

26. The system of claim 14, wherein the source of solution is to provide an aqueous phase;
wherein the source of photoswitchable ionophore is to provide an organic phase containing the photoswitchable ionophore; and
wherein the separator is to separate the organic phase from the aqueous phase.

27. The system of claim 14, wherein the source of the solution containing metal ions is to provide a source of solution containing copper ions.

28. The system of claim 14, further comprising a source of a second photoswitchable ionophore.

29. A water treatment device comprising:
a source of a solution containing metal ions; a
source of a photoswitchable ionophore;
a light source to promote the formation of complexes;
a separator to separate complexes from the solution;
a dissociator having a source of full spectrum light; and
a cathode.

30. The device of claim 29, wherein the light source is to provide primarily ultraviolet light.

* * * * *